("12") United States Patent
Marshall et al.

(10) Patent No.: US 11,472,278 B2
(45) Date of Patent: Oct. 18, 2022

(54) TRACTION BATTERY PROTECTION ASSEMBLY AND METHOD

(71) Applicant: FORD GLOBAL TECHNOLOGIES, LLC, Dearborn, MI (US)

(72) Inventors: John Marshall, Belleville, MI (US); Ihab Grace, Grosse Pointe Woods, MI (US); Rajaram Subramanian, Ann Arbor, MI (US); Sean Brady, Royal Oak, MI (US); John Jardine, Harrison Township, MI (US); Micah Smith, Detroit, MI (US); Mike Popovski, Warren, MI (US); Charles Moore, Royal Oak, MI (US); Suriyaprakash Ayyangar Janarthanam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 17/027,822

(22) Filed: Sep. 22, 2020

(65) Prior Publication Data
US 2022/0089009 A1   Mar. 24, 2022

(51) Int. Cl.
*B60K 1/04* (2019.01)
*B62D 25/20* (2006.01)
*B62D 21/15* (2006.01)
*H01M 50/20* (2021.01)

(52) U.S. Cl.
CPC .............. *B60K 1/04* (2013.01); *B62D 21/15* (2013.01); *B62D 25/20* (2013.01); *H01M 50/20* (2021.01); *B60K 2001/0438* (2013.01); *H01M 2220/20* (2013.01)

(58) Field of Classification Search
CPC ......... B60K 1/04; H01M 50/20; B62D 21/15; B62D 25/20; B62D 25/2036
See application file for complete search history.

(56) References Cited

U.S. PATENT DOCUMENTS

| 5,501,289 | A | * | 3/1996 | Nishikawa | H01M 50/20 180/68.5 |
|---|---|---|---|---|---|
| 8,052,206 | B2 | | 11/2011 | Wang et al. | |
| 10,723,234 | B2 | * | 7/2020 | Gunther | B60L 50/66 |
| 2012/0060361 | A1 | * | 3/2012 | Reis | H01M 50/119 29/623.5 |
| 2012/0164496 | A1 | * | 6/2012 | Lachenmeier | B60L 53/80 429/61 |
| 2015/0274216 | A1 | * | 10/2015 | Van Dyke | B60B 35/006 280/770 |
| 2017/0320381 | A1 | * | 11/2017 | Milton | B60L 8/003 |

FOREIGN PATENT DOCUMENTS

| CN | 207173275 U | 4/2018 |
|---|---|---|
| CN | 108172733 A | 6/2018 |
| CN | 207565712 U | 7/2018 |
| CN | 108528542 B | 8/2019 |

* cited by examiner

*Primary Examiner* — James A English
*Assistant Examiner* — James J Triggs
(74) *Attorney, Agent, or Firm* — David B. Kelley; Carlson, Gaskey & Olds, P.C.

(57) ABSTRACT

An electrified vehicle assembly includes, among other things, a traction battery, and at least one shield extending longitudinally and having a portion that is vertically beneath the traction battery. The shield is removably fastened directly to the traction battery.

18 Claims, 4 Drawing Sheets

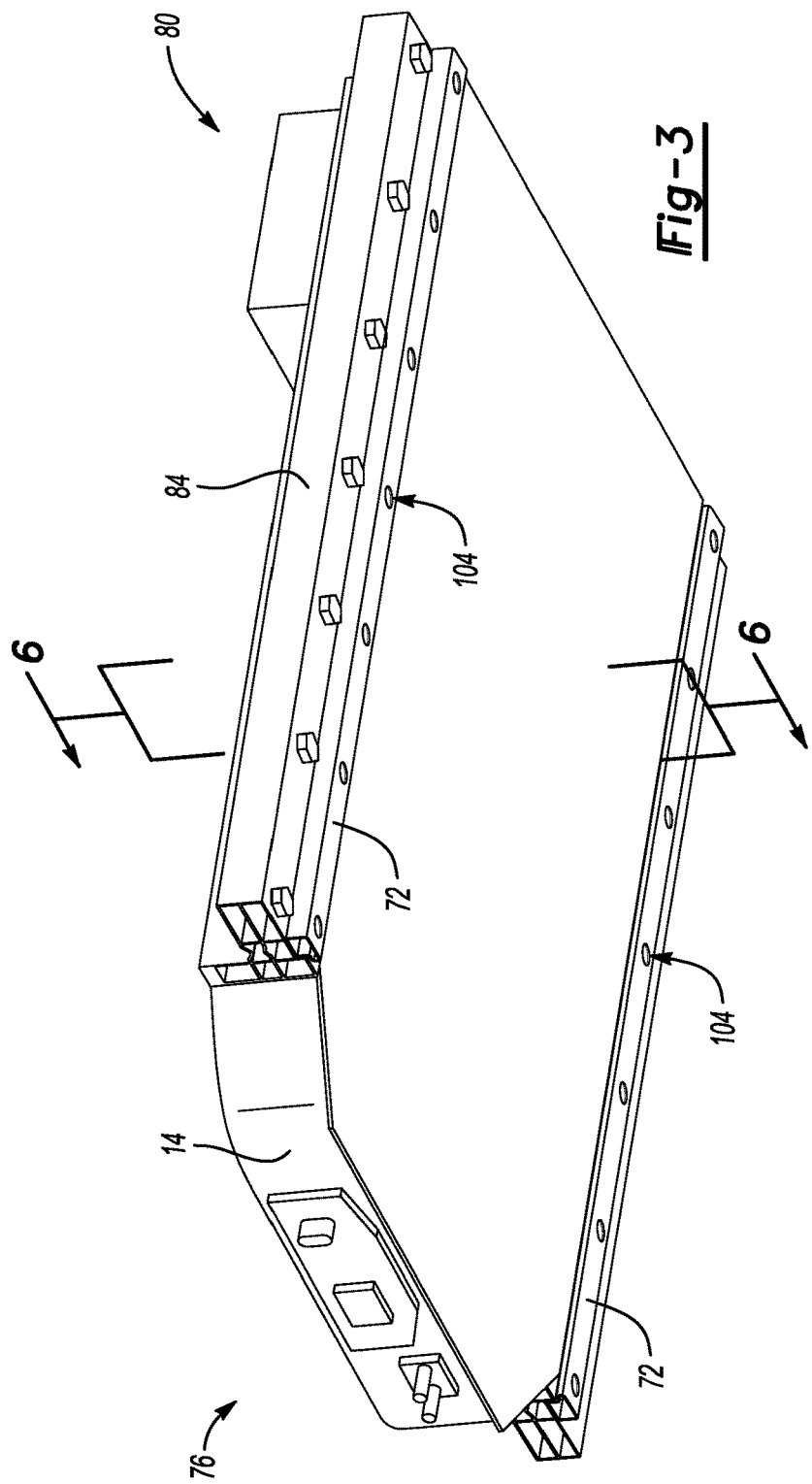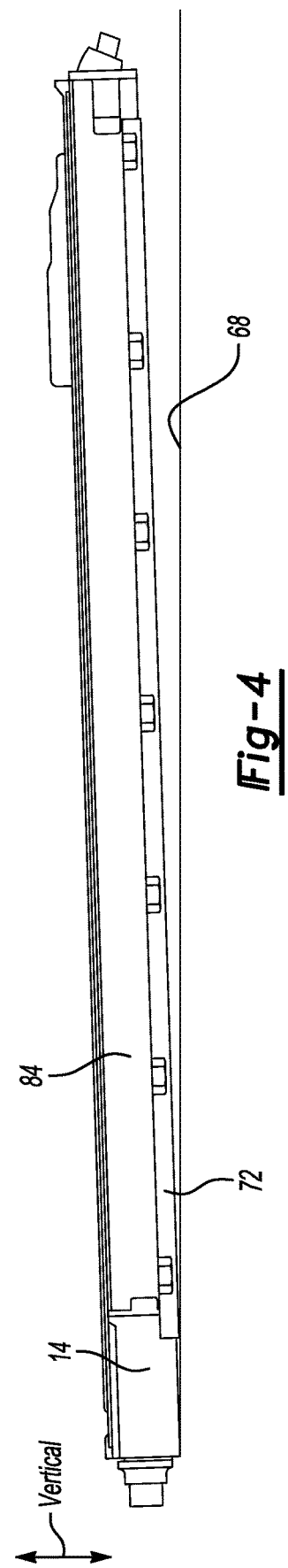

__US 11,472,278 B2__

TRACTION BATTERY PROTECTION ASSEMBLY AND METHOD

TECHNICAL FIELD

This disclosure relates generally to protecting a traction battery and, more particularly, to protecting a traction battery that is secured to an underbody of an electrified vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. A traction battery of an electrified vehicle can include a plurality of battery cell assemblies arranged in one or more battery arrays with an enclosure.

SUMMARY

An electrified vehicle assembly according to an exemplary aspect of the present disclosure includes, among other things, a traction battery, and at least one shield extending longitudinally and having a portion that is vertically beneath the traction battery. The shield is removably fastened directly to the traction battery.

In another example of the foregoing assembly, the shield is directly vertically beneath a side rail of the traction battery and is secured directly to the side rail.

In another example of any of the foregoing assemblies, the side rail and the shield are extruded structures.

In another example of any of the foregoing assemblies, the shield includes a passenger side shield vertically beneath a passenger side rail of the traction battery, and a driver side shield that is directly beneath a driver side rail of the traction battery.

In another example of any of the foregoing assemblies, the shield has a lower side with apertures. The apertures are each configured to provide access to at least one mechanical fastener that secures a top side of the shield to the traction battery.

In another example of any of the foregoing assemblies, the mechanical fasteners secure the top side of the shield directly to the traction battery.

In another example of any of the foregoing assemblies, the mechanical fasteners are rivets.

In another example of any of the foregoing assemblies, the shield is an extruded structure.

In another example of any of the foregoing assemblies, the shield has a box-style cross-section.

In another example of any of the foregoing assemblies, the shield extends longitudinally from a first end portion of the traction battery to a second end portion of the traction battery.

In another example of any of the foregoing assemblies, the shield is a sacrificial component.

In another example of any of the foregoing assemblies, the shield is a metal or metal alloy.

In another example of any of the foregoing assemblies, the shield is disposed beneath an outboard side of the traction battery.

In another example of any of the foregoing assemblies, the shield is configured to be unfastened from the traction battery without detaching the traction battery from an electrified vehicle.

A traction battery protection method according to yet another exemplary aspect of the present disclosure includes, among other things, attaching a shield to a traction battery such that the shield has a portion that is vertically beneath the traction battery. The shield extends longitudinally beneath an outboard side of the traction battery.

Another example of the foregoing method includes moving a fastener through an aperture in a lower side of the shield to a position where the fastener is received within an aperture in an upper side of the shield. The fastener attaches the shield to the traction battery by directly securing the upper side of the shield to a side rail of the traction battery.

In another example of any of the foregoing assemblies, the shield is an extruded shield, and the side rail is an extruded side rail.

In another example of any of the foregoing assemblies, the side rail is mechanically fastened directly to a vehicle structure to attach the traction battery to the vehicle.

In another example of any of the foregoing assemblies, the shield is configured to protect at least one fastener that fastens the side rail to the vehicle structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 shows a perspective view of a traction battery from the powertrain of FIG. 1 along with a pair of traction battery shields.

FIG. 4 illustrates a side view of the traction battery of FIG. 3 and a shield contacting a curb.

DETAILED DESCRIPTION

This disclosure details a protective assembly utilized in connection with a traction battery of an electrified vehicle. In particular, the disclosure relates to an assembly that includes at least one traction battery shield.

The shield can be secured to an underside of a traction battery to protect the traction battery from, for example, an impact load from a curb. The shield can be removed and replaced as required, without removing or replacing the traction battery.

Figure 1:
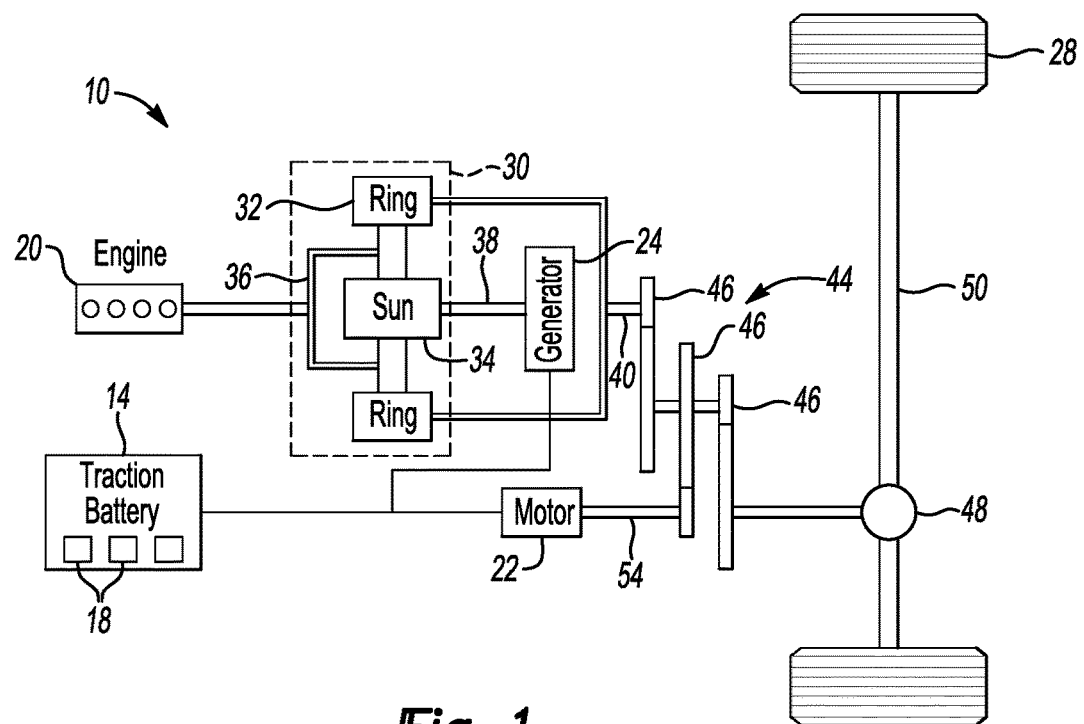
FIG. 1 illustrates a schematic view of a powertrain of an electrified vehicle.

Referring to FIG. 1, a powertrain 10 of a plug-in hybrid electric vehicle (PHEV) includes a traction battery 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to traction batteries in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 2:
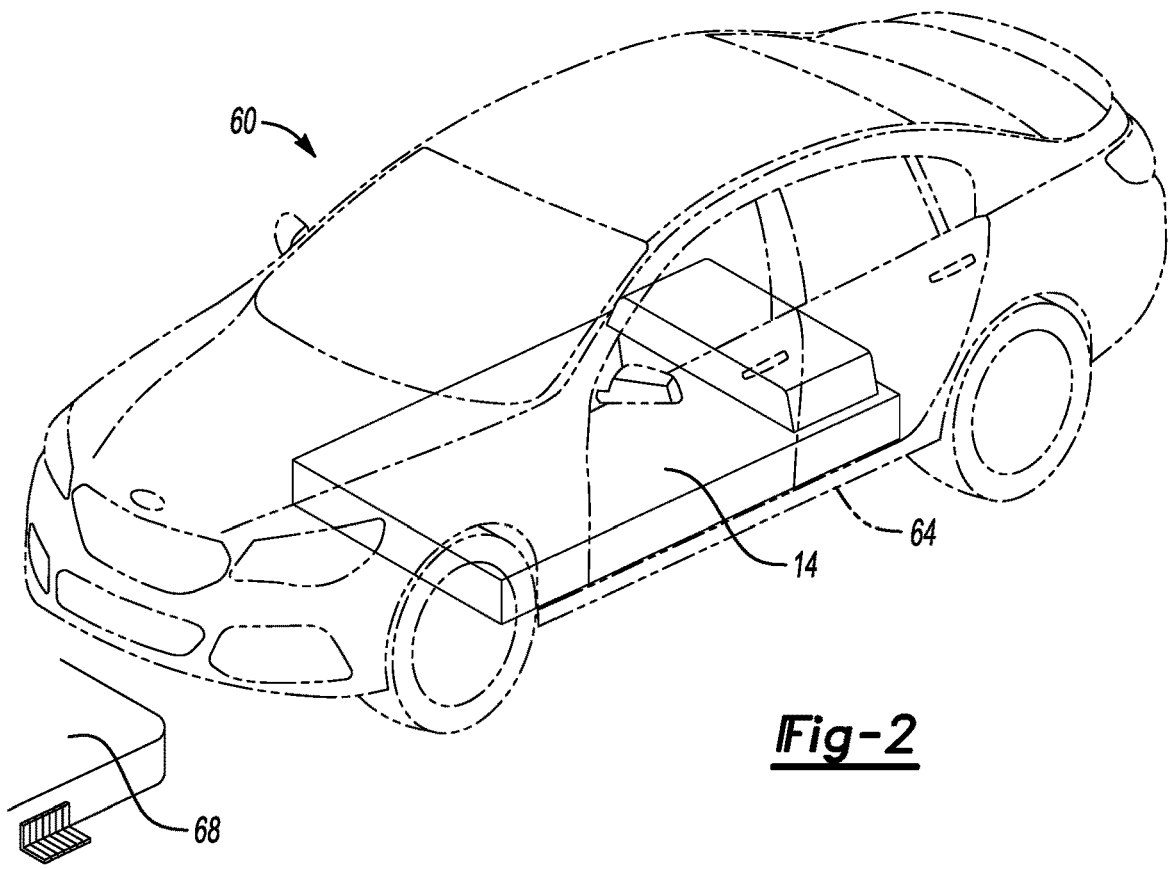
FIG. 2 illustrates a perspective view of an electrified vehicle incorporating the powertrain of FIG. 1.
Figure 5:
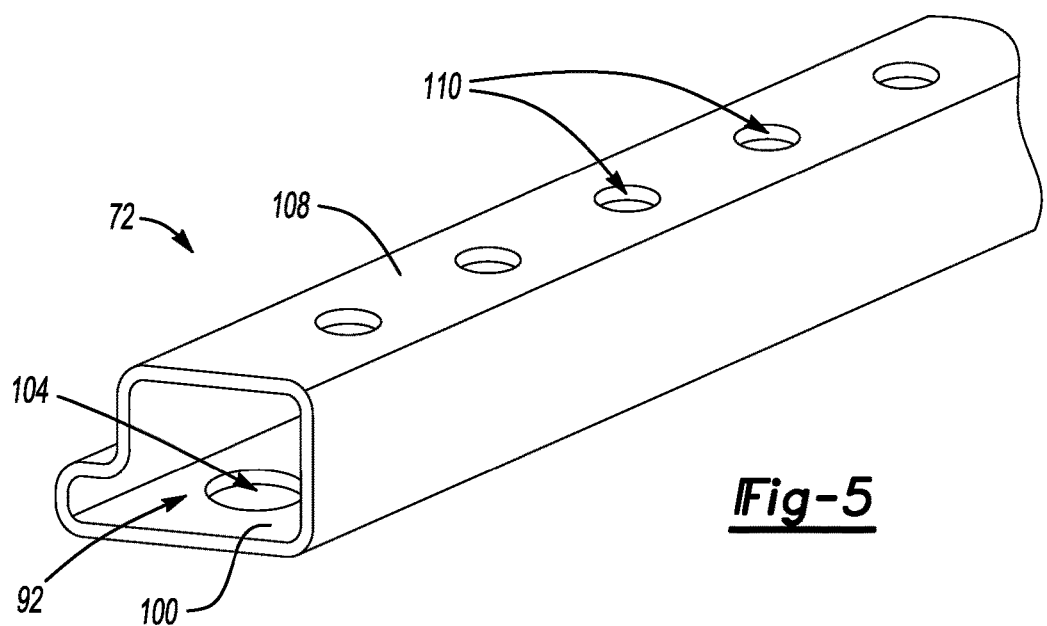
FIG. 5 illustrates a perspective view of a portion of one of the shields in FIG. 3.

With reference to FIG. 2, an electrified vehicle 60 incorporates the powertrain 10 of FIG. 1. In the exemplary vehicle 60, the traction battery 14 of the powertrain 10 is positioned adjacent an underbody 64 of the vehicle 60.

From time to time, a user may drive the vehicle 60 over an obstacle, such as a curb 68. Sufficient contact between the curb 68 and the traction battery 14 can necessitate repairing or replacing the traction battery 14.

With reference to FIG. 3, in the exemplary embodiment, a pair of traction battery shields 72 are disposed along an underside of the traction battery 14. The shields 72 each extend longitudinally from a front area 76 of the traction battery 14 to a rear area 80 of the traction battery 14.

The traction battery 14 includes a pair of side rails 84. One of the side rails 84 is on a passenger side and the other of the side rails 84 is on a driver side. The shields 72 are each disposed vertically beneath one of the side rails 84. In other examples, the shields 72 can instead or additionally be disposed at a front or rear of the traction battery. Vertical, for purposes of this disclosure, is with reference to ground and the general orientation of the vehicle 60 when driving.

The shields 72 are secured such that the shields 72 extend vertically lower than the side rails 84 or any other structure of the traction battery 14. Accordingly, as shown in FIG. 4, when the vehicle 60 is driven over the curb 68, the curb 68 contacts the shield 72 prior to contacting the side rails 84 of the traction battery 14, or any other portion of the traction battery 14. When contact by the curb 68 or another obstacle, the shields 72 can collapse and help to absorb energy directed toward the traction battery 14

The shields 72 protect the traction battery 14 from contact with the curb 68. Components of the vehicle 60, such as brake lines, coolant lines, electrical wires, etc. are often secured to the traction battery 14. The shields 72 can help to protect these components as well.

While the contact between the shield 72 and the curb 68 may potentially deform the shields 72, the shields 72 can be replaced as required without requiring removal or replacement of any portion of the traction battery 14. The shields 72 are considered sacrificial components. That is, the shields 72 are intentionally designed to yield in response to an impact load to help protect the traction battery 14. The shields 72 are, as can be appreciated, are lower cost to replace than the traction battery 14.

With reference now to FIGS. 4-7, the shields 72 in the exemplary embodiment are directly vertically below the side rails 84 of the traction battery 14.

The example shields 72 are extruded from an aluminum material. The shields 72 are another type of metal in another example. The shields 72 could also be polymer-based, metal, metal alloy, or some combination of these.

A person having skill in this art would understand how to structurally distinguish a component that is extruded from another component that is not extruded. Thus, specifying that the shields 72 are extruded implicates structure to the shields 72, and structurally distinguishes the shields from other types of components that are not extruded.

During an extrusion process, material can be pushed through a die having a desired cross-section, the material with the desired cross-section can then be cut to a desired axial length to provide the shields 72.

The example shields 72 have an open cross-section establishing an open area 92. Rivets 96 can be utilized to mechanically fasten the shields 72 to the underside of the side rails 84. To facilitate fastening the shields 72, a bottom side 100 of the shields 72 includes apertures 104. The apertures 104 provide access for the rivets 96 and a rivet tool to move from the bottom side 100, through the open area 92, to an upper side 108. The rivets 96 fasten the upper side 108 of the shields 72 directly to an underside of the side rails 84. Screws, bolts, or another mechanical fastener type could be used instead of rivets 96. The rivets 96, when fastened, extend through an aperture 110 in the upper side 108.

In this example, the side rail 84 of the traction battery 14 is also an extruded structure. A plurality of compression sleeves 112 are held within the side rail 84. During initial assembly of the vehicle 60, mechanical fasteners, here bolts 114, are placed within the compression sleeves 112 and threadably engage a weld nut on a frame member of the vehicle 60. The bolts 114 secured the traction battery 14 to the vehicle.

Figure 6:
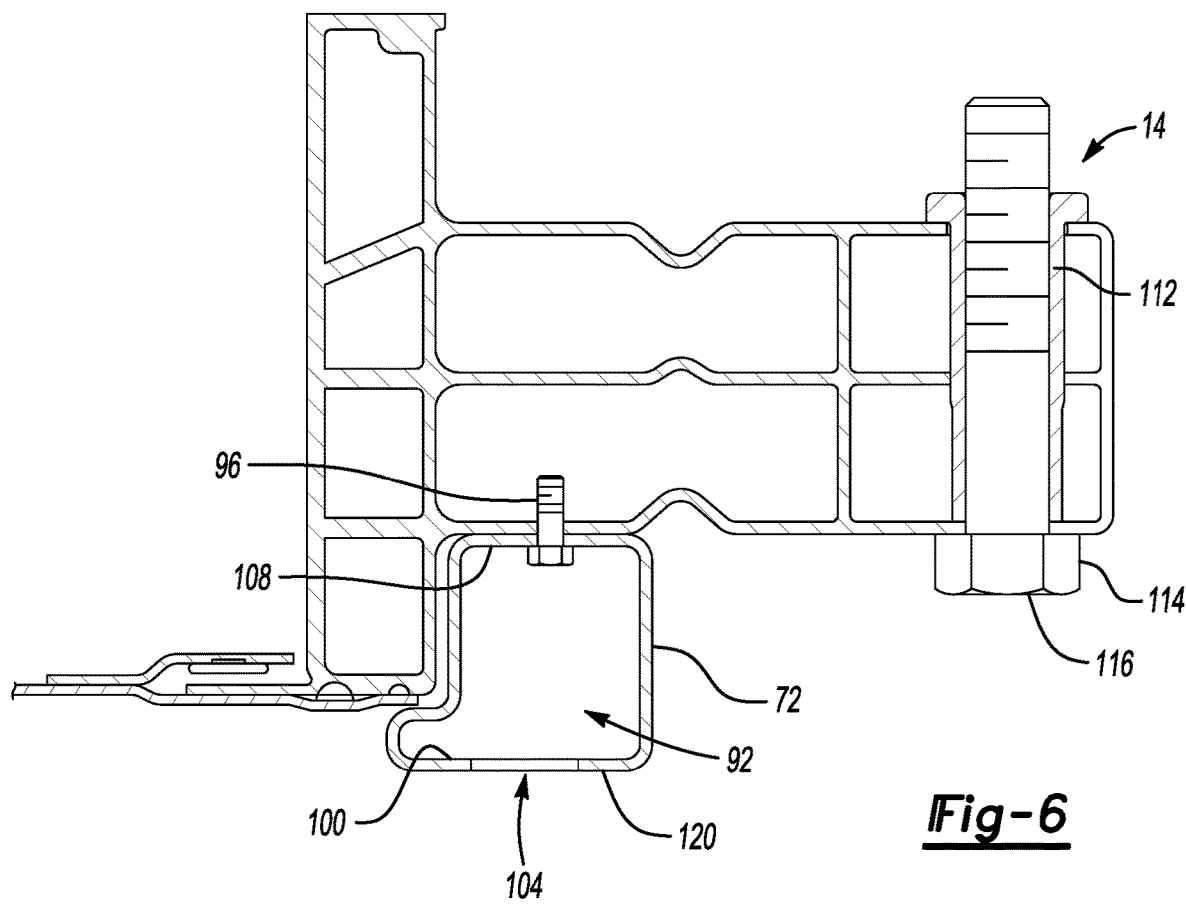
FIG. 6 illustrates a section view at line 6-6 in FIG. 3.
Figure 7:
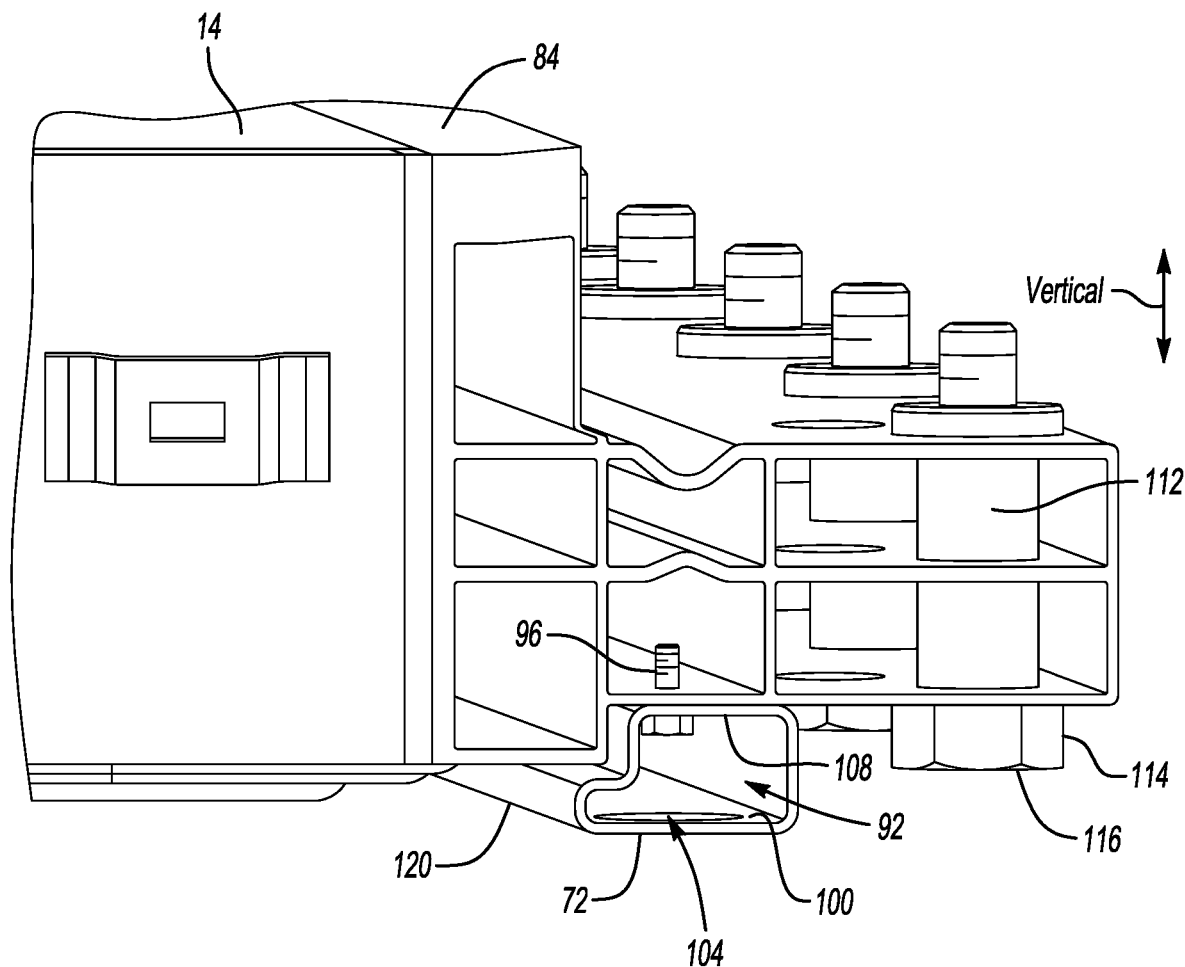
FIG. 7 illustrates a perspective view of the section in FIG. 5.

As shown in FIG. 6, when the traction battery 14 and the shields 72 are installed, heads 116 of the bolt 114 are vertically above the bottom side 100 of the shield 72. Thus, should the vehicle 60 drive over the curb 68, the curb 68 contacts the bottom side 100 prior to contacting the bolts 114.

The placement and design of the shield 72 is thus particularly effective for protecting the attachments, here the bolts 114, that secure the traction battery 14 to the vehicle 60. As can be appreciated, contact between the curb 68 and the bolts 114 could potentially disrupt the integrity of the connection of the traction battery 14 to the vehicle 60.

The shields 72, in some embodiments, can provide a jack point 120. The underbody architecture of many electrified vehicles provides limited locations for interfacing with a jack that is used to lift the electrified vehicle. Incorporating a jack point into the shield 72 can provide an additional option for a jack to lift the electrified vehicle 60.

Features of some of the disclosed examples include a sacrificial element that helps to block objects from striking a traction battery pack. The sacrificial element can be replaced after an impact event. The sacrificial element can be at least partially disposed vertically below the loop 2 curb strike plane since the sacrificial element is a structural component. In this example, loop 2 is a composite of multiple planes which represents the point of ground interaction with a given vehicle component when the vehicle is at maximum loading conditions. If a component is vertically below the loop 2 curb strike plane, the component will potentially contact the ground in the expected use case of the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
 a traction battery; and
 at least one shield extending longitudinally and having a portion that is vertically beneath the traction battery, the at least one shield removably fastened directly to the traction battery,
 wherein the at least one shield is directly vertically beneath a side rail of the traction battery and is secured directly to the side rail,
 wherein the at least one shield has a plurality of apertures, the plurality of apertures each configured to provide access to at least one mechanical fastener that secures the at least one shield to the traction battery,
 wherein the shield is configured to protect at least one fastener that fastens the side rail to the vehicle structure.

2. The vehicle assembly of claim 1, wherein the side rail and the at least one shield are extruded structures.

3. The vehicle assembly of claim 1, wherein the at least one shield includes a passenger side shield vertically beneath a passenger side rail of the traction battery, and a driver side shield that is directly beneath a driver side rail of the traction battery.

4. The vehicle assembly of claim 1, wherein the mechanical fasteners secure a top side of the at least one shield directly to the traction battery.

5. The vehicle assembly of claim 1, wherein the mechanical fasteners are rivets.

6. The vehicle assembly of claim 1, wherein the at least one shield is an extruded structure.

7. The vehicle assembly of claim 1, wherein the at least one shield has a box-style cross-section.

8. The vehicle assembly of claim 1, wherein the at least one shield extends longitudinally from a first end portion of the traction battery to a second end portion of the traction battery.

9. The vehicle assembly of claim 1, wherein the at least one shield is a sacrificial component.

10. The vehicle assembly of claim 1, wherein the at least one shield is a metal or metal alloy.

11. The vehicle assembly of claim 1, wherein the at least one shield is disposed beneath an outboard side of the traction battery.

12. The vehicle assembly of claim 1, wherein that at least one shield is configured to be unfastened from the traction battery without detaching the traction battery from an electrified vehicle.

13. A traction battery protection method, comprising:
 attaching a shield to a traction battery such that the shield has a portion that is vertically beneath the traction battery, the shield extending longitudinally beneath an outboard side of the traction battery, and
 moving a fastener through at least one aperture of the shield to a position where the fastener is received within at least one different aperture of the shield, the fastener attaching the shield to the traction battery by directly securing the shield to a side rail of the traction battery,
 wherein the at least one shield is directly vertically beneath the side rail of the traction battery and is secured directly to the side rail,
 wherein the at least one aperture is within a lower side of the shield and the at least one different aperture is within an upper side of the shield, wherein the step of moving the fastener includes moving the fastener through the at least one aperture within the lower side of the shield to a position where the at least one fastener is received within the at least one different aperture in the upper side of the shield.

14. The traction battery protection method of claim 13, wherein the shield is an extruded shield, wherein the side rail is an extruded side rail.

15. A traction battery protection method, comprising:
 attaching a shield to a traction battery such that the shield has a portion that is vertically beneath the traction battery, the shield extending longitudinally beneath an outboard side of the traction battery, and
 moving a fastener through an aperture in a lower side of the shield to a position where the fastener is received within an aperture in an upper side of the shield, the fastener attaching the shield to the traction battery by directly securing the upper side of the shield to a side rail of the traction battery,
 wherein the side rail is mechanically fastened directly to a vehicle structure to attach the traction battery to the vehicle,
 wherein the shield is configured to protect at least one fastener that fastens the side rail to the vehicle structure.

16. The vehicle assembly of claim 1, wherein the plurality of apertures is a plurality of first apertures, wherein the at least one shield has a lower side that includes the first plurality of apertures and an upper side that includes a second plurality of apertures, the plurality of first apertures each configured to provide access to the at least one mechanical fastener that secures a upper side of the at least one shield to the traction battery.

17. The vehicle assembly of claim 16, wherein the lower and the upper sides of the at least one shield form an open area, wherein at least a portion of the mechanical fastener is disposed in the open area.

18. The traction battery protection method of claim 13, wherein the lower and the upper sides of shield form an open area, and at least a portion of the fastener is disposed in the open area.

\* \* \* \* \*